United States Patent [19]
Chang

[11] Patent Number: 6,021,356
[45] Date of Patent: Feb. 1, 2000

[54] CONTROL SYSTEM USING PROGRAMMABLE LOGIC CONTROLLER

[75] Inventor: Seong Wook Chang, Kyungki-Do, Rep. of Korea

[73] Assignee: LG Industrial Systems Co., Ltd., Seoul, Rep. of Korea

[21] Appl. No.: 08/942,367

[22] Filed: Oct. 2, 1997

[30] Foreign Application Priority Data

Oct. 5, 1996 [KR] Rep. of Korea ................. 96/44054

[51] Int. Cl.[7] .................................................. G05B 15/00
[52] U.S. Cl. ................................... 700/3; 700/5; 700/67; 700/96; 318/568.11; 219/110
[58] Field of Search ..................... 364/132, 134, 364/138, 468.02; 395/200; 318/568.11; 219/110; 700/3, 5, 67, 96

[56] References Cited

U.S. PATENT DOCUMENTS

| | | |
|---|---|---|
| 4,933,833 | 6/1990 | Petroff .................................. 364/138 |
| 4,937,419 | 6/1990 | Kolodziej et al. ..................... 219/110 |
| 4,998,206 | 3/1991 | Jones et al. ......................... 364/468.02 |
| 5,072,374 | 12/1991 | Sexton et al. ......................... 395/200 |
| 5,079,491 | 1/1992 | Nose et al. ........................... 318/568.11 |
| 5,621,672 | 4/1997 | Kobayashi et al. .................... 364/134 |
| 5,632,912 | 5/1997 | Cecil .................................... 219/110 |
| 5,777,870 | 7/1998 | Takaku et al. ........................ 364/132 |
| 5,870,301 | 2/1999 | Yakushuiji et al. ................... 364/132 |

*Primary Examiner*—William Grant
*Assistant Examiner*—McDieunel Marc
*Attorney, Agent, or Firm*—Birch, Stewart, Kolasch & Birch, LLP

[57] ABSTRACT

A control system using a master programmable logic controller (PLC) which efficiently prevents the PLC system from performing an error operation caused by an abnormal state of a master PLC or a communication line error. The control system synchronizes an operating time thereof by resetting the entire remote slave units (RSU) according to the master PLC when respective power-on time points do not correspond between the master PLC and the RSUs, and selectively outputs a finally received data during a normal operation, or an emergency data predetermined by a user, when the data is not received from a master PLC.

9 Claims, 8 Drawing Sheets

CONTROL SYSTEM USING PROGRAMMABLE LOGIC CONTROLLER

BACKGROUND OF THE INVENTION

1. Field of the Invention

The present invention relates to a control system using a programmable logic controller ("PLC"), and more particularly to an improved control system capable of preventing an error operation from occurring in any of a plurality of remote slave units ("RSU"), which error may result from an abnormal state of a master PLC or a communication line.

2. Description of the Prior Art

In general, a PLC system controls a plurality of control targets, such as an electrical switch serving as an input/output (I/O) connection point which is coupled to the PLC by a program that is set by a user. Such a PLC system employs a multi-drop method (1:N communication) in which a plurality of communication stations are connected to each other in a single network.

A local area communication method is adopted to perform the communication between PLC systems, wherein an amount of data ranging from several to dozens of bytes are exchanged in real time base within production lines by use of a manufacturing automation system.

With regard to required data such as the number of packages, errors and out items, the PLC located in each production line utilizing such a manufacturing automation system carries out a real time receive/transmit operation from/to respective PLCs disposed in the other production lines, thereby performing a cooperative task according to the received data.

The PLC and its control targets connected thereto, and the control between the I/O connection points will now be described.

In order to realize such a control system by use of PLC, the PLC requires a CPU (Central Process Unit) and an I/O module provided a distance therefrom.

For economic purposes, instead of installing the CPU and the remote I/O module in each area where control targets are densely populated in the control system, a plurality of remote slave units perform a communication function and an I/O control function, respectively, so that the RSU is widely employed to extend the I/O capacity of the CPU in PLC and to control a remote I/O function.

Figure 1:
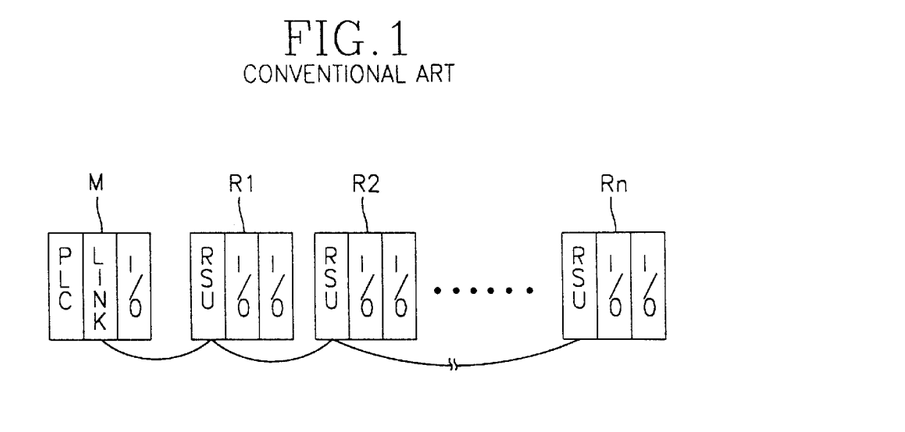
FIG. 1 is a block diagram of a conventional control system including a master PLC(M) and a plurality of RSUs (R1–Rn)

FIG. 1 illustrates a conventional control system including a master PLC(M) and a plurality of RSUs(R1–Rn). As shown therein, the master PLC(M) including a master PLC, a data link, and an I/O module, controls its own I/O connection points using a program and a communication parameter which are set by a user, and also controls the respective I/O connection points for the remote slave units R1–Rn.

Each of the plurality of RSUs(R1–Rn) has at least one I/O module, and carries out a data communication with the master PLC(M) through a communication cable, and accordingly controls its own I/O module.

Figure 2:
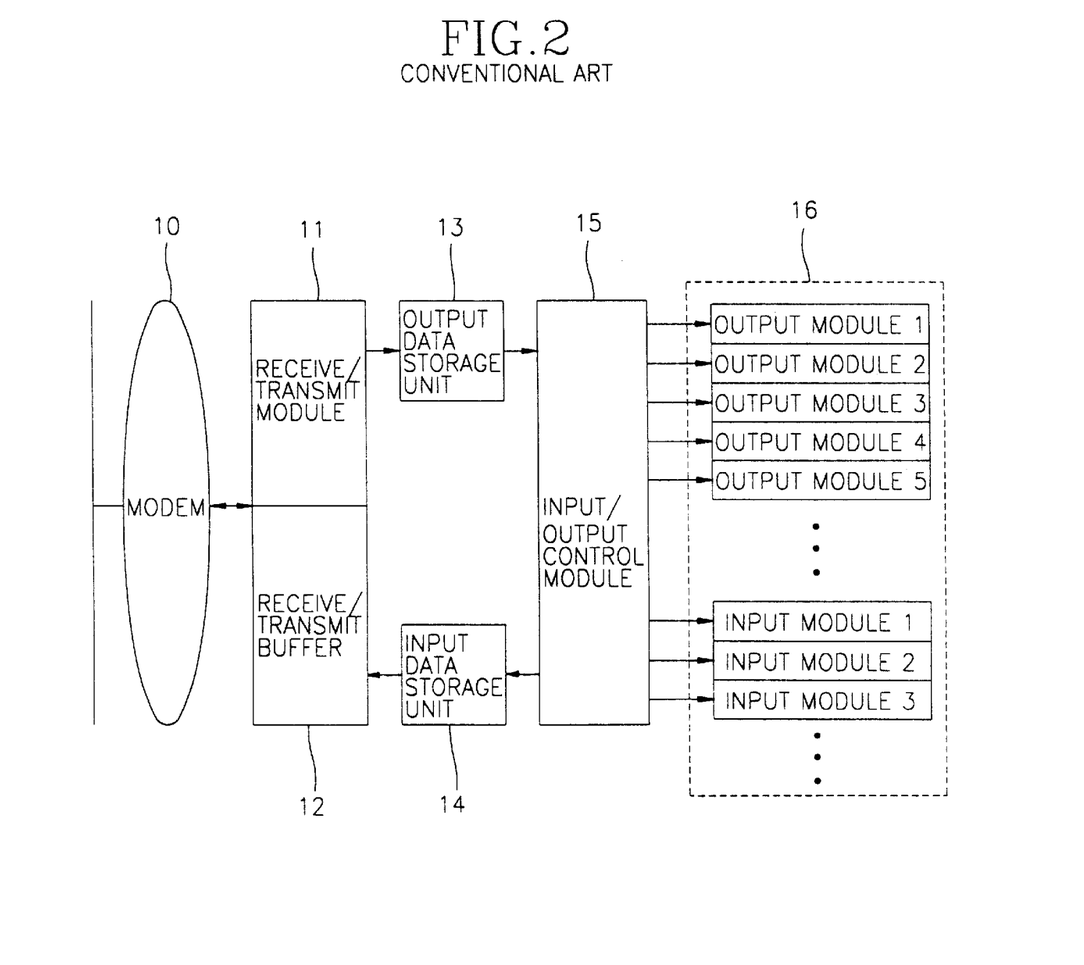
FIG. 2 is a block diagram detailing the RSU in FIG. 1.
Figure 3A:
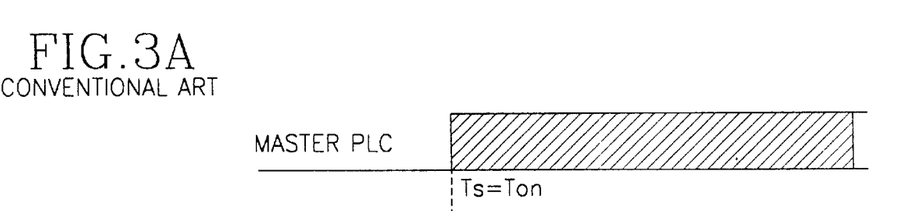
FIGS. 3A through 3D are timing diagrams for an initial operation in the system of FIG.1.
Figure 3B:
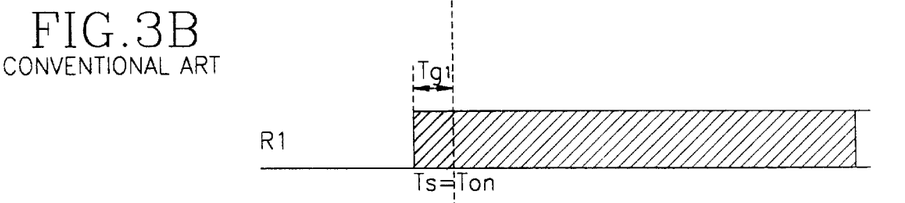
Figure 3C:
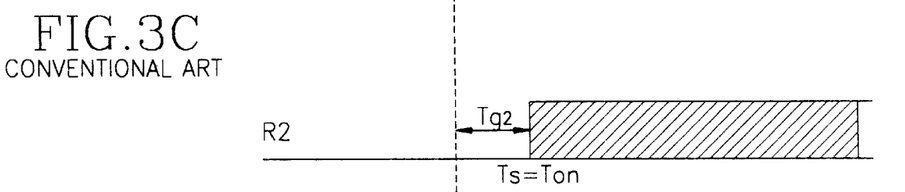
Figure 3D:
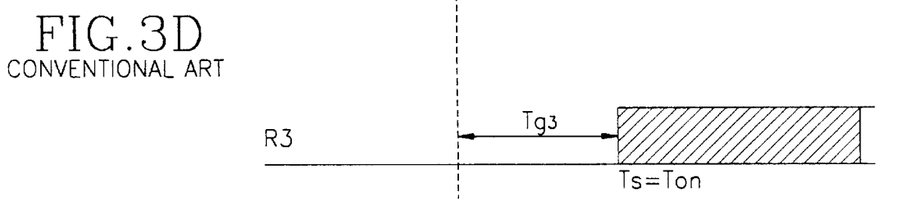

With reference to FIG. 2, each of the RSUs includes: a MODEM 10 for carrying out a communication with the master PLC(M) via a communication cable; a receive/transmit module 11 for exchanging data with the master PLC(M) according to a predetermined protocol; a receive/transmit buffer 12 for temporarily storing therein the data for the exchange; an output data storage unit 13 for storing therein the data which are to be transmitted from the master PLC(M) to an input/output module 16; an input data storage unit 14 for storing therein the data which are to be transmitted from the input/output module 16 to the master PLC(M); and an input/output control module 15 for controlling a data transmission between the data storage units 13, 14 and the input/output module 16.

The operation of the thusly constituted conventional control system will now be explained with reference to the accompanying drawings.

First, the data link in the master PLC(M) is a data linking device attached to the master PLC(M), which operates as a master unit in the related network, and which obtains an initiative of the data communication. The data link is able to set a maximum number N of RSUs.

The RSU sets each number of its own and the master PLC(M), and receives a communication directly from the master PLC(M) for thereby carrying out a data transmission.

The data link in the master PLC(M) sequentially selects the RSUs(R1–Rn) and carries out a data receiving/transmitting operation.

For example, when the data outputted from the master PLC(M) is applied through the communication cable and the MODEM 10 to the RSU(R1), the applied data passes through the receive/transmit buffer 12 and the receive/transmit module 11, and is stored in the output data storage unit 13. The data stored in the output data storage unit 13 is outputted to the input/output module 16 in accordance with the control of the input/output control module 15.

The external control target data read from the input/output module 16 of the remote slave unit R1 is stored in the input data storage unit 14 in accordance with the control of the input/output control module 15. The data stored in the input data storage unit 14 is transmitted through the receive/transmit buffer 12 and the receive/transmit module 11 to the master PLC(M).

FIGS. 3A through 3D are views illustrating respective power-on time points of the master PLC(M) and the RSU (R1–R3), wherein the respective power-on time points of the RSUs differ from the master PLC(M) by Tg1~Tg3 based on the different distances therebetween, Therefore, power-on time Ton and operation start time Ts of the RSUs(R1–R3) are different from each other, and the respective RSUs (R1–R3) become operable with time differences in Tg1~Tg3 on the basis of the master PLC(M).

As a result, the master PLC(M) does not obtain reliability with regard to the RSUs(R1–R3) during each of the Tg1~Tg3, and when a cooperative task is being carried out in accordance with the input/output values of the RSUs (R1–R3), there may occur an error operation in the manufacturing automation system due to the inconsistency in such operation time points.

Also, because the RSU does not carry out a user's program independently and it because controls the data communication and the input/output connection points in accordance with a CPU program in the PLC, the master PLC(M) tends to be unable to control the output values of the RSU under influences of an unstable communication line, a communication interruption, a power supply stoppage to the master PLC(M) and the like.

At this time, the RSU does not receive the data to be output to the output module from the master PLC(M), and accordingly the finally received data stored in the output data storage unit 13 is outputted to the output module in succession, thereby deteriorating the reliability of the control system in a variety of environments.

Further, the power supply time and power stoppage time between the remote slave units which depend upon the master PLC(M) and the individual power supply, are different from each other, whereby the input/output data does not satisfy the synchronization with regard to the input/output data.

SUMMARY OF THE INVENTION

Therefore, it is an object of the present invention to provide a control system using a programmable logic controller capable of selectively outputting a finally received data during a normal operation, or an emergency data predetermined by a user, when the data is not received from a master PLC.

It is another object of the present invention to provide a control system using a programmable logic controller capable of stably carrying out a cooperative task for the entire control system, by synchronizing a data transmission between a master PLC and RSUs which are different from each other in power supply time points.

To achieve the above-described objects, there is provided a control system characterized in a master programmable logic controller (PLC), a plurality of remote slave units (RSUs), and a communication cable for carrying out a data communication between the master PLC and the RSUs, wherein the master PLC includes an emergency data setting unit which enables a user to set a control data for use when the RSUs do not receive the control data from the master PLC, and wherein each of the plurality of RSUs includes an emergency output data storage unit for storing therein the emergency data determined by the emergency data setting unit, a normal output data storage unit for storing therein the control data normally received from the master PLC, an output data selection switch for enabling the user to choose one selected from the emergency output data and the normal output data finally received from the master PLC, when the RSU does not receive the control data from the master PLC, a timer for outputting an output signal when the control data is not received from the master PLC during a predetermined time, and an input/output controller for selectively outputting one selected from the emergency output data stored in the emergency output data storage unit, and the normal output data stored in the normal output data storage unit, when the output signal is received from the timer.

Further, to achieve the above-described objects, there is provided a control system characterized in a master programmable logic controller, a plurality of remote slave units, and a communication cable for carrying out a data communication between the master PLC and the RSUs, wherein the master PLC includes an RSU power-on detector for receiving signals indicating a power-on state from the plurality of RSUs, and outputting the received signals when the RSUs are in the power-on state, and a reset request signal generator for simultaneously outputting a reset request signal to the respective RSUs in response to the output signals from the RSU power-on detector, and wherein each of the RSU includes a power-on signal generator for outputting to the master PLC a signal indicating that the RSU is in a power-on state, and an input/output controller for outputting another reset request signal in accordance with the reset request signal outputted from the reset signal generator.

Still further, to achieve the above-described objects, there is provided a control system characterized in a master programmable logic controller (PLC), a plurality of remote slave units (RSUs), and a communication cable for carrying out a data communication between the master PLC and the RSUs, wherein the master PLC includes an RSU power-on detector for receiving signals indicating a power-on state from the plurality of RSUs, and outputting the received signals when the RSUs are in the power-on state, a reset request signal generator for simultaneously outputting a reset request signal to the respective RSUs in response to the output signals from the RSU power-on detector, and an emergency output data setting unit which enables a user to set a control data for use when the RSUs do not receive the control data from the master PLC, and wherein each of the RSU includes an emergency output data storage unit for storing therein the emergency data determined by the emergency out data setting unit, a normal output data storage unit for storing therein the control data normally received from the master PLC, an output data selection switch for enabling the user to choose one selected from the emergency output data and the normal output data finally received from the master PLC, when the RSU does not receive the control data from the master PLC, a timer for outputting an output signal when the control data is not received from the master PLC during a predetermined time, a power-on signal generator for outputting to the master PLC a signal indicating that the RSU is in a power-on state, and an input/output controller for selectively outputting one selected from the emergency output data stored in the emergency output data storage unit, and the normal output data stored in the normal output data storage unit, when the output signal is received from the timer.

BRIEF DESCRIPTION OF THE DRAWINGS

The present invention will become more clearly understood with reference to the accompanying drawings which are given only by way of illustration and thus are not limitative of the present invention, wherein.

DETAILED DESCRIPTION OF THE INVENTION

Figure 4:
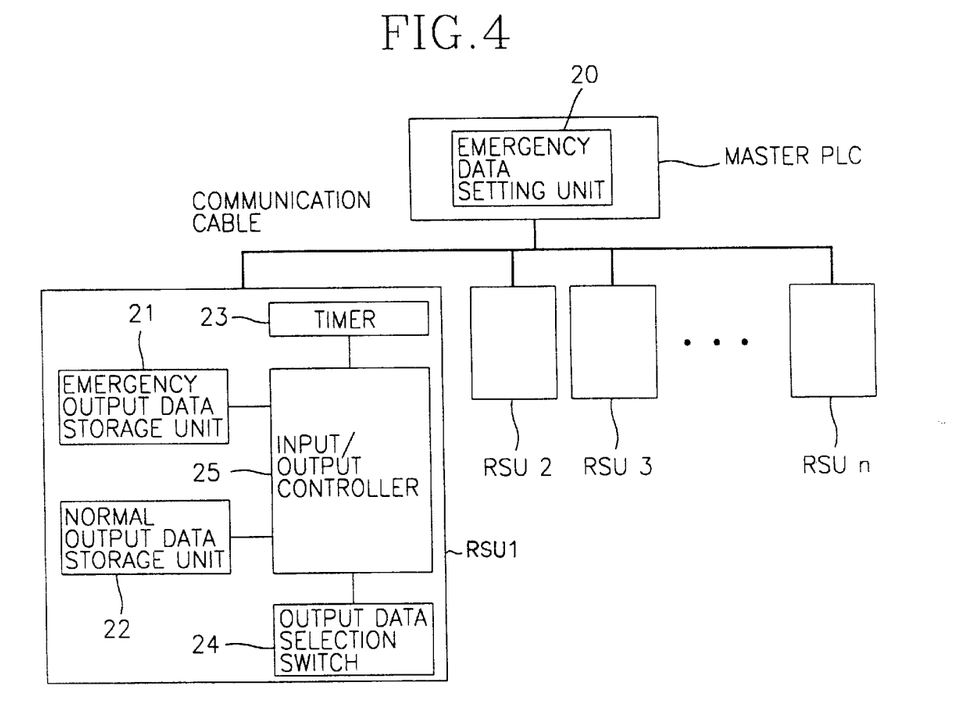
FIG. 4 is a block diagram of a control system according to a first embodiment of the present invention.

FIG. 4 is a block diagram of a control system using a PLC according to the first embodiment of the present invention, wherein one master PLC is coupled in parallel through a communication cable to a plurality of remote slave units (RSU1–RSUn).

The master PLC includes an emergency data setting unit 20. Each of the RSU1–RSUn includes: an emergency output data storage unit 21 for storing therein the emergency data outputted from the emergency data setting unit 20; a normal output data storage unit 22 for storing therein the input/output data during a normal operation; a timer 23 for checking whether the data is transmitted from the master PLC; an output data selection switch 24 for selecting the data outputted from the emergency output data storage unit 21 or the normal output data storage unit 22; and an input/output controller 25 for controlling the data transmission between the respective RSUs and the input/output connection points (not shown).

The operation of the thusly constituted control system according to the first embodiment of present invention will now be described with reference to the accompanying drawings.

Since the RSU1–RSUn are identical to each other in structure, one exemplary RSU1 will be explained for convenience sake.

The master PLC normally receives/transmits the input/output data from/to the input/output modules through the normal output data storage unit 22 and the input/output controller 25 in the RSU1.

When a user determines an output data for being outputted during an emergency output by use of the emergency output data setting unit 20, the master PLC outputs the emergency output data determined in the emergency output data setting unit 20 through the communication cable, and the emergency output data applied to the RSU1 is stored in the emergency output data storage unit 21.

However, even during such a normal operation, there may occur an emergency in which the output data from the master PLC is not transmitted to RSU1 on account of a variety of reasons: communication instability, communication interruption, abnormal-state generation in the master PLC, and supply stoppage of power to the master PLC.

At this time, the timer 23 in the RSU1 performs an hourly checkup with regard to the data received from the master PLC, and notifies the input/output controller 25 whether the data is normally transmitted from the master PLC.

When the data is not received from the master PLC, and the time predetermined in the timer 23 is terminated, the timer 23 outputs the output signal notifying the above to the input/output controller 25 which in turn checks up an output option determined by a user using the output data selection switch 24.

Here, if the output option is set as a latch, the input/output controller 25 outputs the data finally stored in the normal output data storage unit 22 during the normal operation to the input/output module, and if the output option is set as an emergency output, the data stored in the emergency output data storage unit 21 is outputted to the input/output module.

As a result, when an emergency occurs due to a breakdown of the master PLC and a communication interruption, the finally received data or the emergency data is outputted to the input/output module, thereby improving the reliability of the PLC system.

Figure 5:
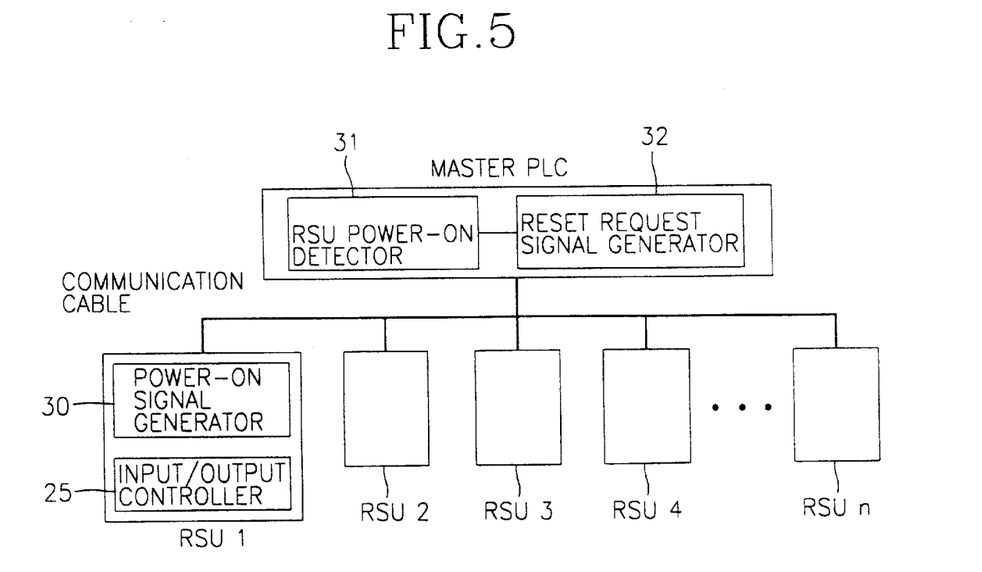
FIG. 5 is a block diagram of a control system according to a second embodiment the present invention.

FIG. 5 is a block diagram illustrating the control system using the PLC according to the second embodiment of the present invention. As shown therein, the master PLC includes an RSU power-on detector 31, and a reset request signal generator 32. Each of the RSU1–RSUn includes a power-on generator 30, and an input/output controller 25.

The operation of the thusly constituted control system according to the second embodiment of the present invention will now be described.

As shown in FIGS. 8A through 8D, the RSU1–RSUn are different from each other in power-on time Ton, respectively.

Therefore, when the power is turned on, the power-on signal generator 30 in each of the RSU1–RSUn transmits the power-on signal through a communication cable to the master PLC. When the transmission is completed, the RSU1–RSUn respectively wait for the transmission of an RSU_RESET command from the master PLC during TRW1–TRW3.

At this time, the RSU power-on detector 31 in the master PLC detects the transmitted power-on signal at the same time of its turning-on, so that the poweron signal is received from all the RSU1–RSUn, and outputted to reset request signal generator 32. Accordingly, the reset request signal generator 32 simultaneously transmits the reset request signal to all the RSU1–RSUn. Here, TMW denotes a time of receiving the RSU_ON power-on signal from the RSU1–RSUn.

The input/output controllers 25 in the respective RSU1–RSUn simultaneously output corresponding reset signals according to the reset request signal outputted from the reset request signal generator 31, whereby the RSU1–RSUn become synchronized to time Ts in their operation.

Figure 6:
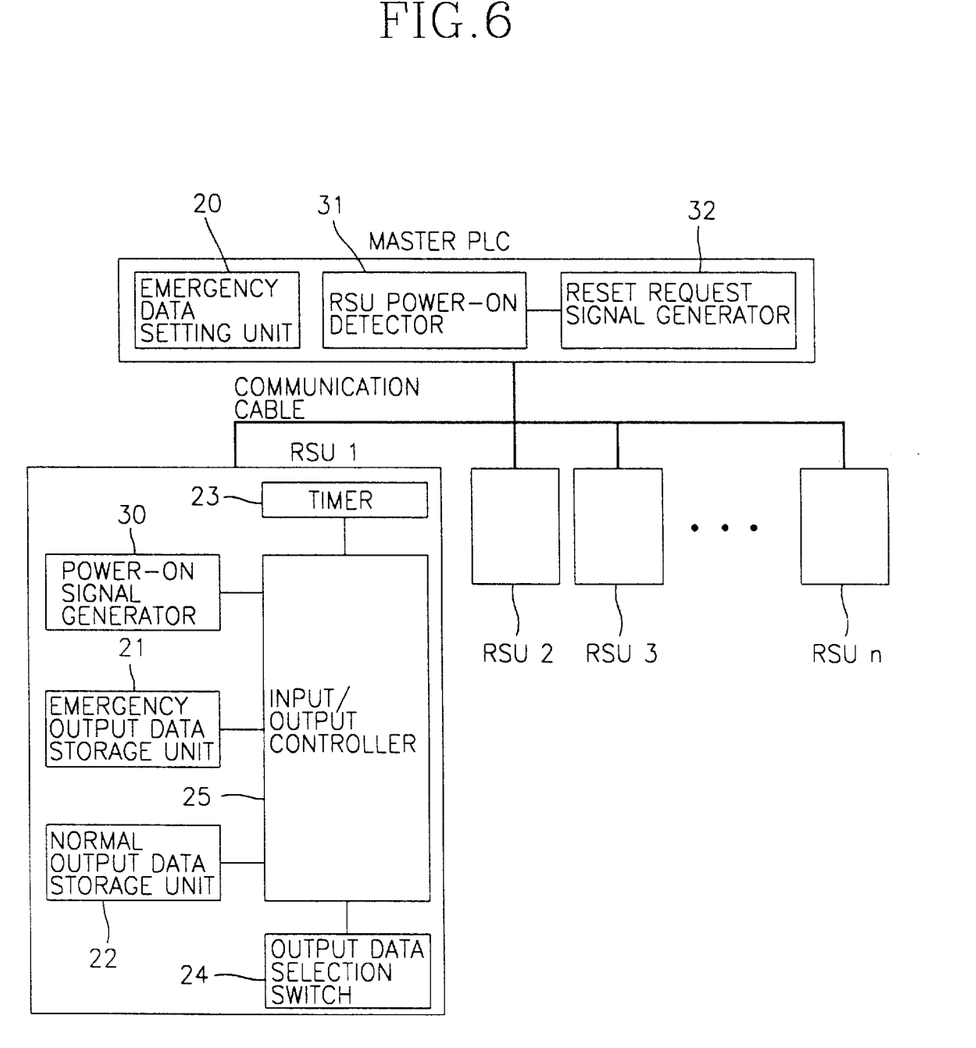
FIG. 6 is a block diagram of a control system according to a third embodiment the present invention.

FIG. 6 is a block diagram according to the third embodiment of the present invention, wherein the first embodiment in FIG. 4 and the second embodiment in FIG. 5 are combined.

Figure 7:
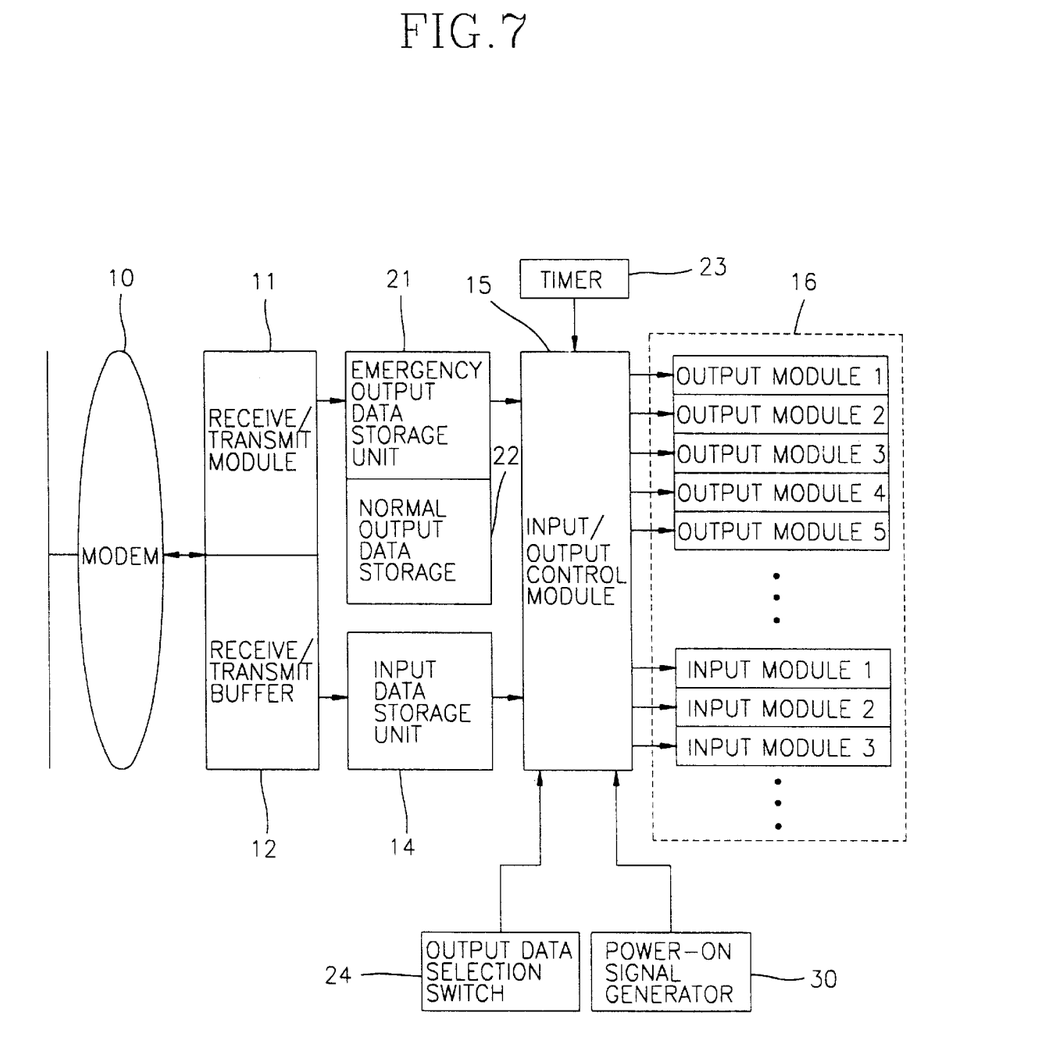
FIG. 7 is a block diagram of one selected from a plurality of RSUs in the control system of FIG. 6.
Figure 8A:
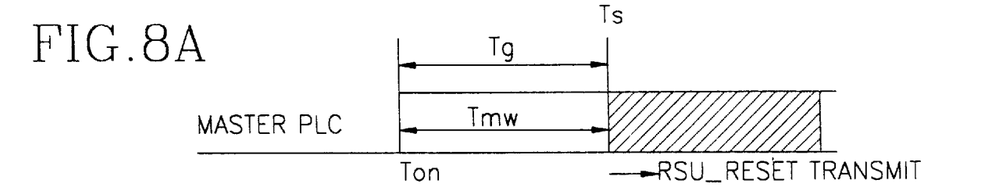
FIG. 8A through 8D are timing diagrams for illustrating an initial operation in the system of FIG. 1.
Figure 8B:
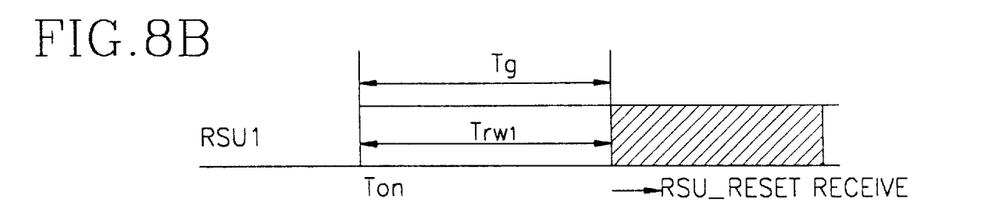
Figure 8C:
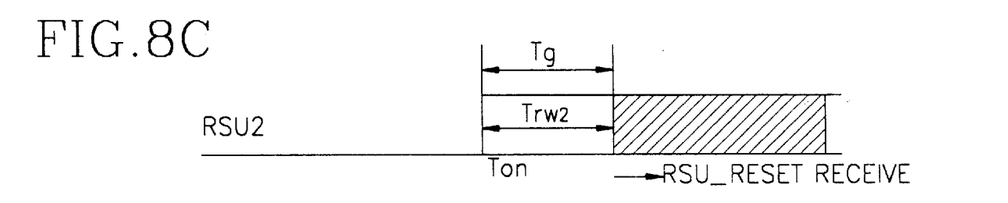
Figure 8D:
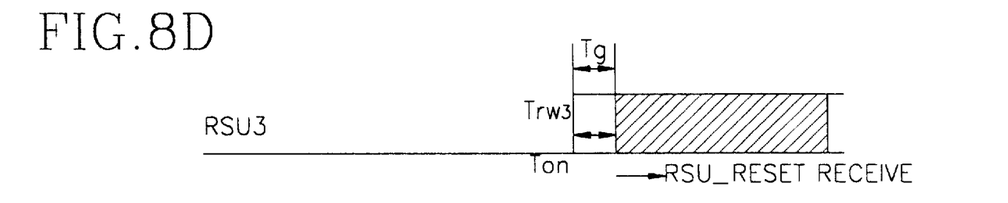

Also, FIG. 7 is a block diagram detailing the RSU according to the third embodiment of the present invention, wherein the RSU further includes an emergency output data storage unit 21, an output data selection switch 24 and a timer 23, in addition to the conventional control system shown in FIG. 1.

The third embodiment of the present invention disclosed in FIGS. 6 and 7 will be explained with reference to FIGS. 8 through 10.

First, As shown in FIG. 8, the respective RSU1–RSUn are turned on by power in different power-on times Ton, and when the power is turned on, each of the RSU1–RSUn transmits an RSU_ON flag to the master PLC through the MODEM 10 and the communication cable so as to notify the power-on.

Figure 9:
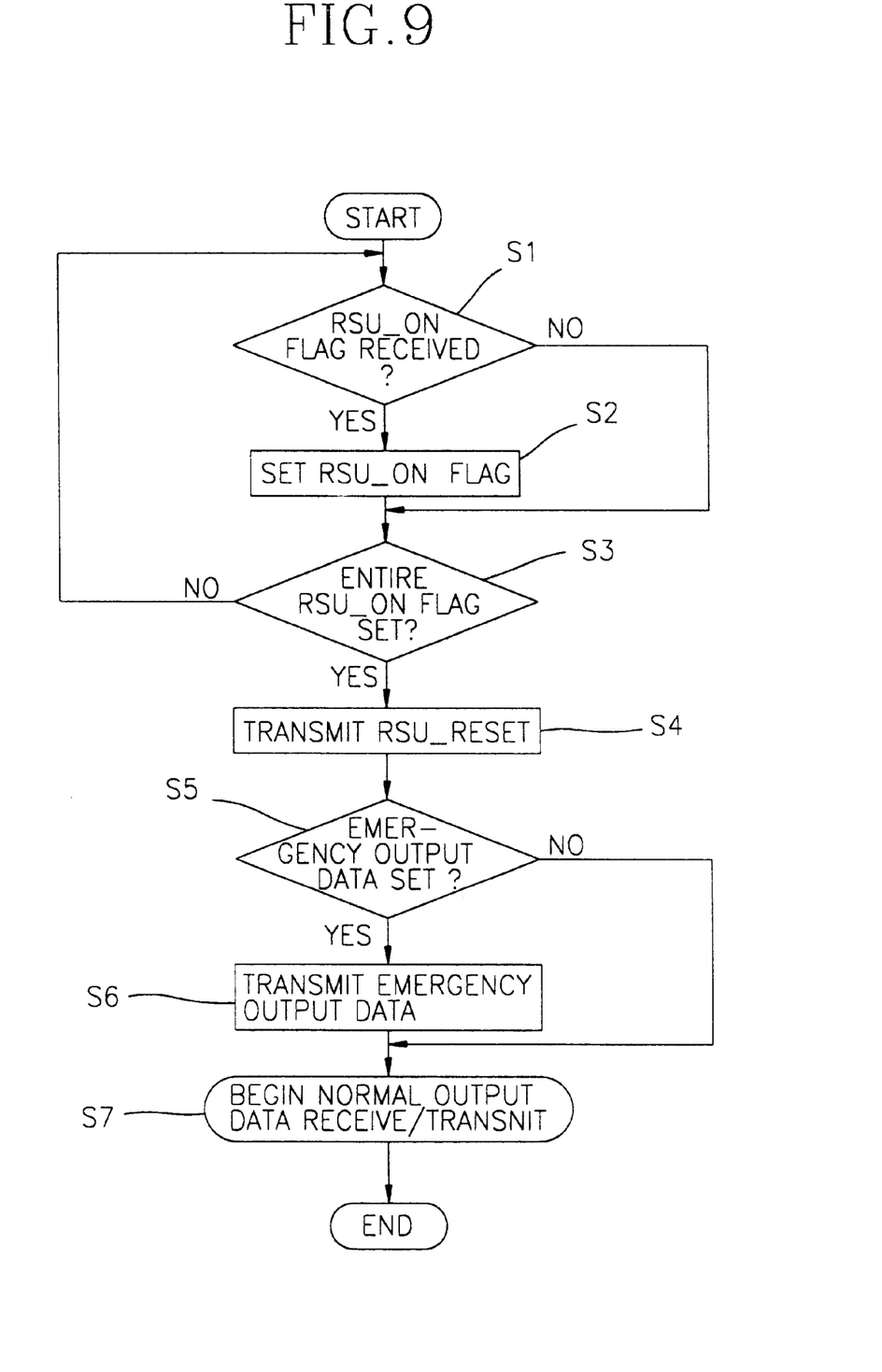
FIG. 9 is a flow chart illustrating a control operation in the master PLC in FIG. 4.

At this time, the master PLC, as shown in FIG. 9, checks up (Step S1) the reception of the RSU_ON flag, and the received RSU_ON flag is set (Step S2) with regard to a corresponding one of the RSUs.

Then, the master PLC determines that all the RSU1–RSUn are turned on, if the RSU_ON flag is received from each of the RSU1–RSUn and all the RSU_ON flags are set (Step S3). Then the RSU_RESET data is transmitted (Step S4). In FIGS. 8A–8D, TMW denotes time for receiving the RSU_ON flag from the RSU1–RSUn.

Also, the master PLC determines (Step S5) whether there is an emergency output data set by the emergency output data setting unit 20, and when there is a preset emergency output data, the emergency output data is transmitted (Step S6) and the input/output control of the RSUs is carried out (Step S7) by a normal receive/transmit operation of an input/output data with the RSU(R1–Rn).

The entire RSU1–RSUn are reset by the RSU_RESET data outputted from the master PLC, so that all the RSU1–RSUn starts a reset operation from a time point Rs when the RSU_RESET command is received from the master PLC for thereby synchronizing the operation time.

Figure 10:
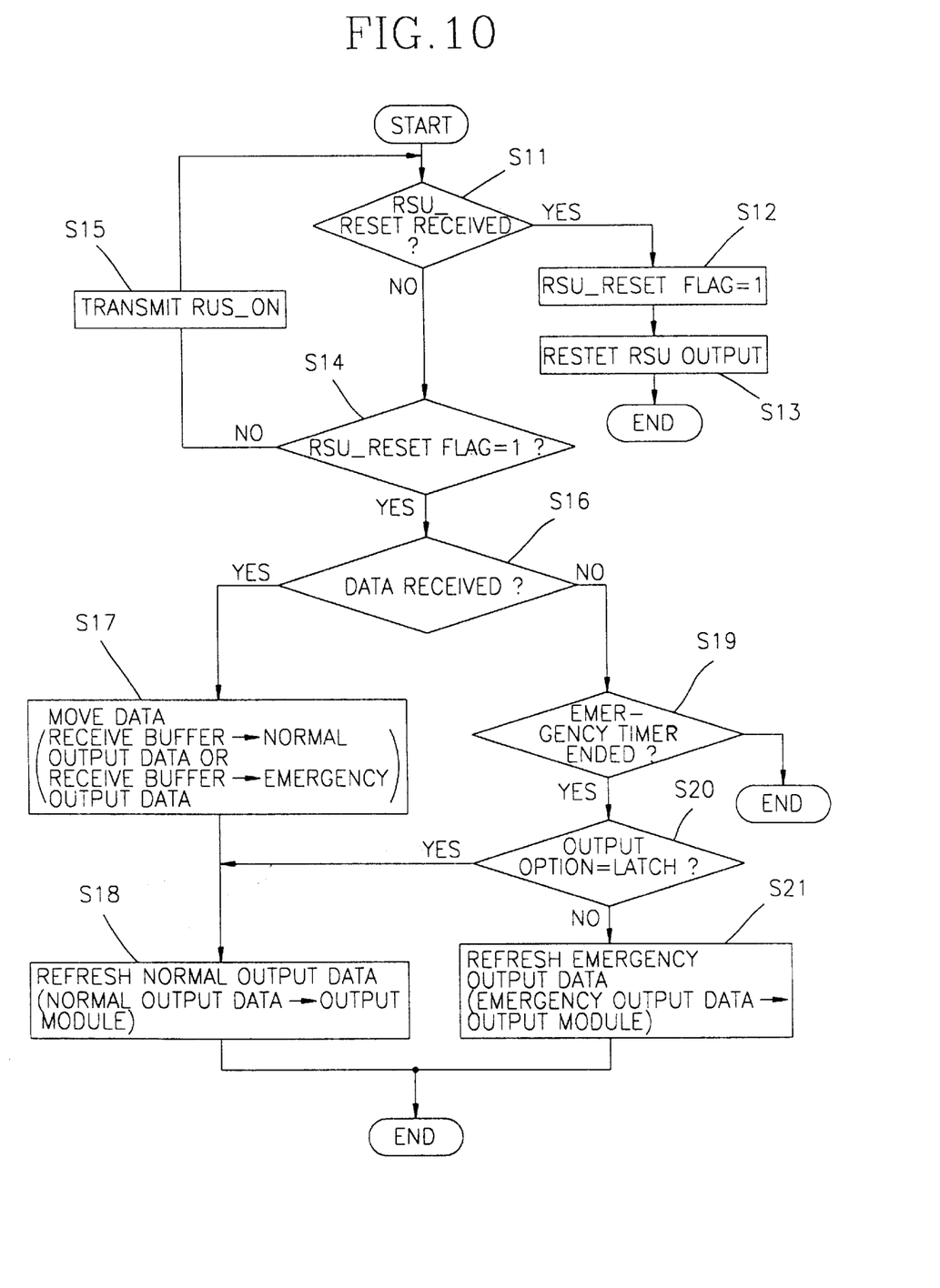
FIG. 10 is a flow chart illustrating a control operation in the plurality of RSUs of FIG. 4.

That is, as shown in FIG. 10, the RSU1–RSUn respectively carry out (Step S11) a checkup of the reception of the RSU_RESET data from the master PLC, at the same time when the power is turned on.

When the RSU_RESET data is received, each of the RSUs sets its own RSU_RESET flag as "1" so as to indicate the completed reception of the first RSU_RESET data, and then the input/output module 16 that corresponds thereto becomes reset for thereby resetting the RSU output (Steps S12, S13). On the other hand, when the RSU_RESET data is not received, it is checked up whether the RSU_RESET flag is set as "1" (Step S14).

As a result of the checkup, when it is disclosed that the RSU_RESET flag is set as "1", it means that there was one reset request of the master PLC, so that the respective RSUs turns back to a normal operation and waits until the data from the master PLC is received. Meanwhile, if the RSU_RESET flag is determined to be set as "0", it means that there is no reset request of the master PLC, so that the RSU transmits the RSU_ON flag to the master PLC so as to notify that the power is put into the RSU (Step 15), and then carries out the operations coming after Step S11.

Consequently, despite the gap Tg between the power-on time point of the RSU1–RSUn and that of the master PLC(M), the entire system may simultaneously carry out an cooperative task at time point Ts.

Also, in a state in which the RSU_RESET flag is set as "1", when the RSU_RESET is further received from the master PLC, the RSU comes to judge that the master PLC has requested the reset operation, so that all the output modules are reset, for thereby preventing an error output of the control system (Steps S12, S13).

Thereafter, when the RSU_RESET flag is "1", that is, when the data is received from the master PLC during a normal state (Step S16), the RSU stores the received data temporarily stored in the receive/transmit buffer 12 or the emergency output data in the normal output data storage unit 22 or the emergency output data storage unit 21, through the receive/transmit module 11 (Step S17).

The input/output control module 15 outputs the data stored in the normal output data storage unit 21 to the output module of the input/output module 16, and the data read from the input module of the input/output module 16 is stored in the input data storage unit 14, for thereby carrying out a normal input/output refresh operation (Step S18).

Then, according to the request of the master PLC, the data stored in the input data storage unit 14 is transmitted through the receive/transmit buffer 12 and the receive/transmit module 11 to the master PLC.

Here, even during such a normal operation, there may occur an emergency in which the output data from the master PLC is not transmitted to RSU1–RSUn on account of a variety of reasons: communication instability, communication interruption, abnormal-state generation in the master PLC, and supply stoppage of power to the master PLC.

At this time, the timer 23 in the RSU1 performs an hourly checkup with regard to the data received from the master PLC, and notifies the input/output controller 15 whether the data is normally transmitted from the master PLC.

When the data is not received from the master PLC, and the time predetermined in the timer 23 is terminated (Step S19), the input/output controller 15 checks up an output option determined by a user using the output data selection switch 24 (Step S20).

Here, if the output option is set as a latch, the input/output controller 25 outputs the data finally stored in the normal output data storage unit 22 during the normal operation to the input/output module 16 (Step S18), and if the output option is set as an emergency output, the data stored in the emergency output data storage unit 21 is outputted to the input/output module 16 (Step S21).

For instance, assuming that an output module 1 in the input/output module 16 is a connection point for controlling a gas valve, when the master PLC is unable to control the output module 1 on account of a communication interruption, the RSU outputs the data stored in the normal output data storage unit 22 shortly prior to the communication interruption, so that when the communication is interrupted in a state in which the gas valve is opened, there may occur a danger of gas leakage.

Therefore, the present invention enables a user to set the output option and the emergency output value by use of the output data selection switch 24.

Although the output option is set as the emergency output by the user, when the emergency output value is not determined, the emergency data stored in the emergency output data storage unit 21 becomes "0", so that the output data "0" is outputted to the output module in the emergency generation, for thereby naturally resetting the output.

The embodiments of the invention disclosed in the above description are not limitative to the accompanying claims, and it will be clear that a variety of alternations, modifications and amendments are possible to those who are skilled in the related art.

As described above, the control system according to the present invention serves to carry out a cooperative task in further stability by synchronizing the entire system operation in spite of the discordance of the power-on time points.

Further, the present invention prevents an error operation from occurring in any of the remote slave units, which may result from an abnormal state of a master PLC or a communication line, for thereby enhancing the reliability of the PLC system.

What is claimed is:

1. A control system including a master programmable logic controller (PLC), a plurality of remote slave units (RSUs), and a communication cable for carrying out a data communication between the master PLC and the RSUs, wherein the master PLC comprises:

an emergency data setting unit which enables a user to set a control data for use when the RSUs do not receive the control data from the master PLC, and wherein each of the plurality of RSUs comprises:

an emergency output data storage unit for storing therein the emergency data determined by the emergency data setting unit;

a normal output data storage unit for storing therein the control data normally received from the master PLC;

an output data selection switch for enabling selection from among the emergency output data and the normal output data received from the master PLC, when the RSU does not receive the control data from the master PLC;

a timer for generating a time out signal when the control data is not received from the master PLC for a predetermined amount of time; and an input/output controller for selectively outputting data selected from among the emergency output data stored in the emergency output data storage unit and the normal output data stored in the normal output data storage unit based on whether the time out signal is received from the timer.

2. A control system including in a master programmable logic controller (PLC), a plurality of remote slave units (RSUs), and a communication cable for carrying out a data communication between the master PLC and the RSUs, wherein the master PLC comprises:

an RSU power-on detector for receiving signals indicating a power-on state from the plurality of RSUs, and outputting the received signals when the RSUs are in the power-on state; and a reset request signal generator for simultaneously outputting a reset request signal to the respective RSUs in response to the output signals from the RSU power-on detector, and wherein each of the RSU comprises:

a power-on signal generator for outputting to the master PLC a signal indicating that the RSU is in a power-on state; and an input/output controller for outputting another reset request signal in accordance with the reset request signal outputted from the reset signal generator.

3. The control system of claim 2, wherein the master PLC further comprises:

an emergency output data setting unit which enables a user to set a control data for use when the RSUs do not receive the control data from the master PLC, and wherein each of the RSU further comprises:

an emergency output data storage unit for storing therein the emergency data determined by the emergency out data setting unit;

a normal output data storage unit for storing therein the control data normally received from the master PLC;

an output data selection switch for enabling selection from among the emergency output data and the normal output data received from he master PLC, when the RSU does not receive the control data from the master PLC; and a timer for generating a time out signal when the control data is not received from the master PLC for a predetermined amount of time, wherein the input/output controller selectively outputs data selected from among the emergency output data stored in the emergency output data storage unit and the normal output data stored in the normal output data storage unit based on whether the time out signal is received from the timer.

4. A master programmable logic controller that controls plural remote slave units via communication of data therewith, comprising:

a reset request signal generator that generates a reset request signal for the remote slave units in response to a signal from the remote slave units indicating a power-on state, and that outputs the reset request signal to the plural remote slave units simultaneously an emergency data setting unit storing control data used to control the remote slave units that do not receive control data from the master programmable logic controller due to communications problems.

5. The master programmable logic controller recited by claim 4, wherein the communications problems are identified based on a time out condition.

6. A slave unit that is controlled by a remote master programmable logic controller via communication of control data therefrom, comprising:

a storage unit for storing emergency control data for controlling the slave unit when the slave unit does not receive control data from the master programmable logic controller due to communications problems;

a communications problem detector that detects communications problems between the slave unit and the remote master programmable logic controller; and an input/output controller for selectively outputting data from the storage unit based on whether communications problems are detected by the communications problem detector.

7. The slave unit recited by claim 6, wherein the storage unit includes a normal output data storage unit that stores normal control data received from the remote master programmable logic controller and used to control the slave unit when communications problems are not detected by the communications problem detector.

8. The slave unit recited by claim 6, wherein the communications problem detector includes a timer that generates a time-out signal when control data is not received from the master programmable logic controller for a predetermined amount of time, and wherein the input/output controller selectively outputs data from the storage unit based on whether the timer has generated the time-out signal.

9. The slave unit recited by claim 8, wherein the storage unit includes a normal output data storage unit that stores normal control data received from the remote master programmable logic controller and used to control the slave unit when the timer has not generated the time-out signal.

* * * * *